United States Patent [19]
Connell et al.

[11] Patent Number: 5,509,142
[45] Date of Patent: Apr. 23, 1996

[54] RAISED ARM COVERALLS

[75] Inventors: Cynthia A. Connell, Roswell, Ga.; Kimberly S. Houchens, Raleigh, N.C.; Leslie H. Van Hout, Roswell, Ga.

[73] Assignee: Kimberly-Clark Corporation, Neenah, Wis.

[21] Appl. No.: 84,935

[22] Filed: Jun. 30, 1993

[51] Int. Cl.$^6$ .................................................. A41D 13/00
[52] U.S. Cl. ............................................... 2/79; 2/82
[58] Field of Search ........................... 2/79, 69, 77, 82, 2/2, 125, 901, 81, 46; 428/288, 284, 224, 286, 287

[56] References Cited

U.S. PATENT DOCUMENTS

| | | |
|---|---|---|
| D. 236,293 | 8/1975 | Banks ............................ D2/17 |
| 2,497,764 | 2/1950 | Doughty ........................ 2/114 |
| 2,579,275 | 12/1951 | Schworm, Jr. ................ 128/287 |
| 2,664,526 | 1/1954 | Mianulli ........................ 2/2 |
| 2,976,182 | 3/1961 | Caldwell et al. ............. 117/135.5 |
| 3,654,632 | 4/1972 | Lacroix ......................... 2/125 |
| 3,720,957 | 3/1973 | Patience ....................... 2/114 |
| 3,849,802 | 11/1974 | Govaars ....................... 2/81 |
| 4,041,203 | 8/1977 | Brock et al. ................. 428/157 |
| 4,117,552 | 10/1978 | Simpson ...................... 2/79 |
| 4,303,712 | 12/1981 | Woodroof ..................... 428/58 |
| 4,338,371 | 7/1982 | Dawn et al. ................ 428/283 |
| 4,374,888 | 2/1983 | Bornslaeger ................ 428/198 |
| 4,443,511 | 4/1984 | Worden et al. ............. 428/198 |
| 4,454,191 | 6/1984 | vonBilcher et al. ........ 428/244 |
| 4,493,870 | 1/1985 | Vrouenraets et al. ...... 428/245 |
| 4,539,255 | 9/1985 | Sato et al. .................. 428/252 |
| 4,670,913 | 6/1987 | Morell et al. ............... 2/227 |
| 4,683,593 | 8/1987 | Langley ....................... 2/82 |
| 4,705,717 | 11/1987 | Cain et al. .................. 428/252 |
| 4,709,419 | 12/1987 | Heyn et al. .................. 2/46 |
| 4,713,068 | 12/1987 | Wang et al. ................. 604/366 |
| 4,725,481 | 2/1988 | Ostapchenko ............... 428/213 |
| 4,753,843 | 6/1988 | Cook et al. .................. 428/286 |
| 4,758,239 | 7/1988 | Yeo et al. .................... 604/366 |
| 4,772,510 | 9/1988 | McClure ...................... 428/286 |
| 4,829,602 | 5/1989 | Harreld et al. .............. 2/51 |
| 4,833,010 | 5/1989 | Langley ...................... 428/287 |
| 4,855,178 | 8/1989 | Langley ...................... 428/287 |
| 4,857,393 | 8/1989 | Kato et al. .................. 428/289 |

(List continued on next page.)

FOREIGN PATENT DOCUMENTS

| | | |
|---|---|---|
| 0199472 | 10/1986 | European Pat. Off. . |
| 0290900 | 11/1988 | European Pat. Off. . |
| 0391661 | 10/1990 | European Pat. Off. . |
| 2468321 | 5/1981 | France . |
| 2467557 | 5/1981 | France .......................... 2/79 |
| 2514256 | 4/1983 | France .......................... 2/79 |
| 59-159338 | 9/1984 | Japan . |
| 62-028475 | 2/1987 | Japan . |
| 62-064833 | 3/1987 | Japan . |
| 2-276636 | 11/1990 | Japan . |
| 0419859 | 3/1934 | United Kingdom . |

*Primary Examiner*—Amy B. Vanatta
*Attorney, Agent, or Firm*—Karl V. Sidor

[57] ABSTRACT

Disclosed is a disposable protective coverall formed from a high strength barrier fabric, the coverall being composed of a body portion having a neck opening in a shoulder line at its top; two sleeve portions extending from the body portion in which each sleeve portion has an inner edge and an outer edge; and two leg portions extending from the body portion. The outer edge of each sleeve portion extends upward from the shoulder line at an angle ranging from about 10° to about 90° and the inner edge of each sleeve extends upward from the body portion below the shoulder line so that arm movement is permitted without significant pulling or stressing of other portions of the coverall. The high strength barrier fabric can be a laminate containing at least one nonwoven web and at least one film layer. Desirably, the film layer has a thickness of at least about 1 mil and has a peak energy of at least 6 inch•pounds force per square inch in both the machine and cross-machine directions. The high strength barrier fabric may also be a breathable barrier laminate which provides a water vapor transmission rate greater than about 100 gm/m$^2$/24 hours.

20 Claims, 2 Drawing Sheets

U.S. PATENT DOCUMENTS

| | | | |
|---|---|---|---|
| 4,863,788 | 9/1989 | Bellairs et al. | 428/246 |
| 4,864,655 | 9/1989 | McKenney et al. | 2/93 |
| 4,871,600 | 10/1989 | Amann | 428/56 |
| 4,871,611 | 10/1989 | LeBel | 528/266 |
| 4,872,220 | 10/1989 | Haruvy et al. | 2/243 A |
| 4,884,768 | 12/1989 | Ansley | 2/79 |
| 4,908,260 | 3/1990 | Dodia et al. | 428/215 |
| 4,924,525 | 5/1990 | Bartasis | 2/2 |
| 4,935,287 | 6/1990 | Johnson et al. | 428/198 |
| 4,943,473 | 7/1990 | Sahatjian et al. | 428/245 |
| 4,943,475 | 7/1990 | Baker et al. | 428/246 |
| 4,970,105 | 11/1990 | Smith, Jr. | 428/198 |
| 4,981,738 | 1/1991 | Farnworth et al. | 428/55 |
| 5,024,594 | 6/1991 | Athayde et al. | 428/246 |
| 5,082,721 | 1/1992 | Smith, Jr. et al. | 428/252 |
| 5,102,711 | 4/1992 | Keller et al. | 428/71 |
| 5,134,017 | 7/1992 | Baldwin et al. | 428/198 |
| 5,155,867 | 10/1992 | Norvell | 2/82 |
| 5,165,110 | 11/1992 | Grilliot et al. | 2/81 |
| 5,170,506 | 12/1992 | Lewis, Jr et al. | 2/79 |
| 5,190,806 | 3/1993 | Nomi | 428/198 |
| 5,204,156 | 4/1993 | Lumb et al. | 428/96 |
| 5,208,313 | 5/1993 | Krishnan | 528/28 |
| 5,234,525 | 8/1993 | Krishnan | 156/331.7 |
| 5,268,222 | 12/1993 | Honeycutt | 2/171 |

RAISED ARM COVERALLS

FIELD OF THE INVENTION

The present invention relates to protective garments. More particularly, the present invention relates to protective garments having improved comfort.

BACKGROUND

There are many types of limited use or disposable protective apparel designed to provide barrier properties. One type of protective apparel is disposable protective coveralls. Coverails can be used to effectively seal off a wearer from a harmful environment in ways that open or cloak style garments such as, for example, drapes, gowns and the like are unable to do. Accordingly, coveralls have many applications where isolation of a wearer is desirable.

Protective garments should be resistant to liquids. For a variety of reasons, it is undesirable for liquids and/or pathogens which may be carried by liquids to pass through garments to contact persons working in an environment where pathogens are present.

Similarly, it is highly desirable to isolate persons from harmful substances which may be present in a work place or accident site. To increase the likelihood that the protective clothing is correctly worn thereby reducing the chance of exposure, workers would benefit from wearing protective clothing that is relatively liquid resistant and durable but which is still comfortable so it does not reduce the workers' performance. After use, it is usually quite costly to decontaminate protective clothing that has been exposed to a harmful or hazardous substance. Thus, it is important that a protective garment be inexpensive so as to be disposable.

Generally speaking, disposable protective apparel is made from fabrics that are relatively impervious to liquids and/or particulates. These barrier-type fabrics must also be suited for the manufacture of protective apparel at such low cost that may be economical to discard the garments after only a single use. Most inexpensive materials used for protective apparel are inelastic. During movement of a wearer, such fabrics can create significant stress or pulling in other portions of the garment. For example, when arms are raised above the shoulders the crotch portion of the garment may be pulled or stressed. Likewise, when the arms are extended far in front of the body, the back, neck and/or crotch portions of the garment may be pulled or stressed. Pulling or stressing portions of a protective garment may be quite uncomfortable to the wearer and can create rips, holes and/or tears compromising protection.

Although pulling or stress can be minimized by inserting elastic material into a protective garment, a process of manufacturing garments elastic strips, portions and/or panels generally tends to be more complex and less efficient than a process of making garments without such features. Complex and relatively inefficient manufacturing processes can eliminate the cost advantages provided by inexpensive materials. Moreover, the additional seams may cause weak points that can compromise the protection of a wearer.

In some situations, pulling or stress can be addressed by providing a non-elastic fabric having stretch and recovery properties. For example, fabrics having low strength and/or toughness may be used to provide a certain amount of "give" or nonelastic deformation to a garment to allow freedom of movement. However, such fabrics can be relatively expensive and might not provide the desired barrier and toughness properties, particularly when stretched an appreciable amount.

Thus, a need exists for an inexpensive disposable protective coverall which provides desirable barrier properties and toughness as well as a comfortable fit. There is also a need for a inexpensive disposable protective coverall which is relatively tough, durable, conformable, lightweight and suited for high-speed manufacturing and converting processes. For example, a need exists for protective coveralls that are composed substantially or entirely of a high strength barrier material such that the garments are relatively impermeable to liquids and/or particulates and so inexpensive as to be disposable while also being breathable and having a comfortable design.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, for example, U.S. Pat. No. 5,213,881, entitled "A Nonwoven Web With Improved Barrier Properties", incorporated herein by reference in its entirety.

As used herein, the term "thermoplastic material" refers to a high polymer that softens when exposed to heat and returns to its original condition when cooled to room temperature. Natural substances which exhibit this behavior are crude rubber and a number of waxes. Other exemplary thermoplastic materials include, without limitation, polyvinyl chlorides, polyesters, polyamides, polyfluorocarbons, polyolefins, polyurethanes, polystyrenes, polyvinyl alcohols, caprolactams, copolymers of ethylene and at least one vinyl monomer (e.g., poly(ethylene vinyl acetates), copolymers of ethylene and n-butyl acrylate (e.g., ethylene n-butyl acrylates), and cellulosic and acrylic resins.

As used herein, the term "disposable" is not limited to single use articles but also refers to articles that can be discarded if they become soiled or otherwise unusable after only a few uses.

As used herein, the term "coveralls" refers to protective apparel and/or shields including for example, but not limited to, coveralls, work suits and the like, as well as outer covers for specialized protective apparel. Generally speaking, coveralls are composed of a body portion having a neck opening in a shoulder line at its top; two sleeve portions extending from the body portion; and two leg portions extending from the body portion.

As used herein, the term "machine direction" refers to the planar dimension of a nonwoven fibrous web which is in the direction of travel of the forming surface onto which fibers are deposited during formation of the web.

As used herein, the term "cross-machine direction" refers to the planar dimension of a nonwoven fibrous web which is in the direction that is perpendicular to the machine direction defined above.

As used herein, the term "barrier fabric" refers to a fabric having a useful level of resistance to penetration by liquid and/or particulates. Generally speaking, resistance to liquid penetration is measured by hydrostatic head tests, strike-through tests, water spray penetration tests and the like. Unless otherwise specified, a material with resistance to liquid penetration refers to material having a hydrostatic head of at least about 20 centimeters as determined in accordance with the standard hydrostatic pressure test AATCCTM No. 127-1977. For example, such a liquid resistant material may have a hydrostatic head of 60 centimeters or more. Resistance to penetration by particulates may be measured by determining the air filter retention of dry particles and can be expressed as a particles holdout efficiency. In particular, particle hold-out efficiency refers to the efficiency of a material at preventing the passage of particles of a certain size range through the material. Particle holdout efficiency may be measured by determining the air filter retention of dry particles utilizing tests such as, for example, IBR Test Method No. E-217, Revision G (Jan. 15, 1991) performed by InterBasic Resources, Inc. of Grass Lake, Mich. Generally speaking, a high particle holdout efficiency is desirable for barrier fabrics. Desirably, barrier fabrics should resist penetration by a column of tap water of at least about 20 cm and/or should have a particle hold-out efficiency of at least about 40 percent for particles having a diameter greater than about 0.1 micron.

As used herein, the term "high strength fabric" refers to fabrics having a toughness or peak total energy absorbed (i.e., total energy absorbed at peak load) of at least about 6 inch·pounds force per square inch $(in \cdot lb_f)/in^2$ in both the machine and cross-machine directions of the fabric. A high strength fabric may have a toughness or peak total energy absorbed much greater at least about 6 $(in^{TM}lb_f)/in^2$ in both the machine and cross-machine directions of the fabric. For example, a high strength fabric may have a toughness or peak total energy absorbed of at least about 15 $(in^{TM}lb_f)/in^2$ or even 30 $(in \cdot lb_f)/in^2$ or more, in both the machine and cross-machine directions of the fabric. In addition to toughness, high strength fabrics should provide relatively low levels of deformation or elongation in response to a stretching force. Deformation or elongation can compromise the protection of a barrier fabric. High strength fabrics typically have a total elongation (i.e., elongation at break or failure of the sample) of less than about 100 percent in both the machine and cross machine directions. For example, high strength barrier fabrics may have an elongation of less than about 75 percent in both the machine and cross machine directions. Desirably, high strength barrier fabrics may have an elongation of less than about 60 percent in both the machine and cross machine directions. More desirably, high strength barrier fabrics may have an elongation of less than about 40 percent in both the machine and cross machine directions.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The problems described above are addressed by a disposable protective coverall formed from a high strength barrier fabric, the coverall being composed of a body portion having a neck opening in a shoulder line at its top; two sleeve portions extending from the body portion in which each sleeve portion has an inner edge and an outer edge; and two leg portions extending from the body portion. According to the invention, the outer edge of each sleeve portion extends upward from the shoulder line at an angle ranging from about 10° to about 90° and the inner edge of each sleeve extends upward from the body portion below the shoulder line so that arm movement is permitted without significant pulling or stressing of other portions of the coverall. For example, the outer edge of each sleeve portion may extend upward from the shoulder line at an angle ranging from about 15° to about 75°. As a further example, the outer edge of each sleeve portion may extend upward from the shoulder line at an angle ranging from about 20° to about 45°.

In one aspect of the invention, the high strength barrier fabric is a laminate containing at least one nonwoven web and at least one film layer. The high strength barrier fabric may have a basis weight ranging from about 25 grams per square meter (gsm) to about 300 gsm. For example, the high strength barrier fabric may have a basis weight ranging from about 50 gsm to about 250 gsm. The nonwoven web component may be one or more bonded carded webs, webs of spunbonded filaments, webs of meltblown fibers, laminates containing spunbonded filament webs and meltblown fiber webs and mixtures thereof. These nonwoven webs may be formed from a polymer selected from polyamides, polyolefins, polyesters, polyvinyl alcohols, polyurethanes, polyvinyl chlorides, polyfluorocarbons, polystyrenes, caprolactams, copolymers of ethylene and at least one vinyl monomer (e.g., poly(ethylene vinyl acetates), copolymers of ethylene and n-butyl acrylate (e.g., ethylene n-butyl acrylates), and cellulosic and acrylic resins. For example, if the nonwoven web is formed from a polyolefin, the polyolefin may be polyethylene, polypropylene, polybutene, ethylene copolymers, propylene copolymers and butene copolymers. Generally speaking, the nonwoven web component of the high strength barrier fabric may have a basis weight ranging from about 15 gsm to about 200 gsm. For example, the nonwoven web component may have a basis weight ranging from about 25 gsm to about 150 gsm. Desirably, the nonwoven web component of the high strength barrier fabric may have a basis weight ranging from about 20 gsm to about 75 gsm.

The high strength barrier fabric may include least one film layer made of a polymer selected from polyesters, polyamides, polyolefins, polyvinyl chloride, polyfluorocarbons, polyurethane, polystyrene, caprolactams, copolymers of ethylene and at least one vinyl monomer (e.g., poly(ethylene vinyl acetates), copolymers of ethylene and n-butyl acrylate (e.g., ethylene n-butyl acrylates), and cellulosic and acrylic resins. If the film is formed from a polyolefin, the polyolefin may be, for example, polyethylene, polypropylene, polybutene, ethylene copolymers, propylene copolymers and butene copolymers. Generally speaking, the film layer will have a thickness ranging from about 0.25 mil to about 5.0 mil. For example, the film will have a thickness ranging from about 0.5 mil to about 3.0 mil. Desirably, the film will have a thickness ranging from about 1.0 mil to about 2.5 mil.

In one aspect of the present invention, the high strength barrier fabric contains a film layer having a thickness of at least about 1 mil and has a peak energy of at least 6 inch•pounds force per square inch (in•lb$_f$)/in$^2$ in both the machine and cross-machine directions. For example, the film may have a thickness of at least about 1 mil and has a peak energy of at least 15 (in$^{TM}$lb$_f$)/in$^2$ in both the machine and cross-machine directions. Desirably, the film has a thickness of at least about 1 mil and has a peak energy of at least 30 (in•lb$_f$)/in$^2$ in both the machine and cross-machine directions. In another aspect of the present invention, the high strength barrier fabric contains a film layer having a thickness of at least about 1 mil and has a total elongation of less than about 100 percent in both the machine and cross machine directions. For example, the high strength barrier fabric may have an elongation of less than about 75 percent in both the machine and cross machine directions. Desirably, the high strength barrier fabric may have an elongation of less than about 60 percent in both the machine and cross machine directions. More desirably, the high strength barrier fabric may have an elongation of less than about 40 percent in both the machine and cross machine directions.

In another aspect of the invention, the disposable protective coverall is formed from a breathable barrier laminate of at least one nonwoven web and at least one film layer, in which the film component of the breathable barrier laminate has a thickness of at least about 1 mil and a peak energy of at least 6 (in•lb$_f$)/in$^2$ in both the machine and cross-machine directions, and the breathable barrier laminate provides a water vapor transmission rate greater than about 100 grams/m$^2$/24 hours. For example, the breathable barrier laminate may provide a water vapor transmission rate greater than about 500 grams/m$^2$/24 hours. Desirably, the breathable barrier laminate may provide a water vapor transmission rate greater than about 750 grams/m$^2$/24 hours.

DETAILED DESCRIPTION

The present invention is directed to disposable protective coveralls made from a high strength barrier fabric. Generally speaking, the coverall is composed substantially or entirely of the high strength inelastic barrier fabric. The coverall includes a body portion having a neck opening in a shoulder line at its top; two sleeve portions extending from the body portion in which each sleeve portion has an inner edge and an outer edge; and two leg portions extending from the body portion. According to the invention, the outer edge of each sleeve portion extends upward from the shoulder line at an angle φ ranging from about 10° to about 90° and the inner edge of each sleeve extends upward from the body portion below the shoulder line so that arm movement is permitted without significant pulling or stressing of other portions of the coverall. Generally speaking, the outer edge of each sleeve portion may extend upward from the shoulder line at an angle φ ranging from about 15° to about 75°. As an example, the outer edge of each sleeve portion may extend upward from the shoulder line at an angle φ ranging from about 20° to about 45°.

The disposable protective coveralls of the present invention, having high strength and a design which permits arm movement without pulling or stressing other portions of the coverall, are particularly well suited for use in applications such as chemical protective garments and/or as industrial workwear garments. The disposable protective coveralls are formed from high strength materials having dimensional stability for ease of donning and toughness for durable barrier properties yet provide useful arm movement without pulling or stressing other portions of the coverall which adds to the safety and comfort of a wearer. Importantly, the flexible arm movement is provided without requiring a substantially larger-sized coveralls which could increase the likelihood that excess material will snag, tear or become caught on objects in the workplace.

Figure 1:
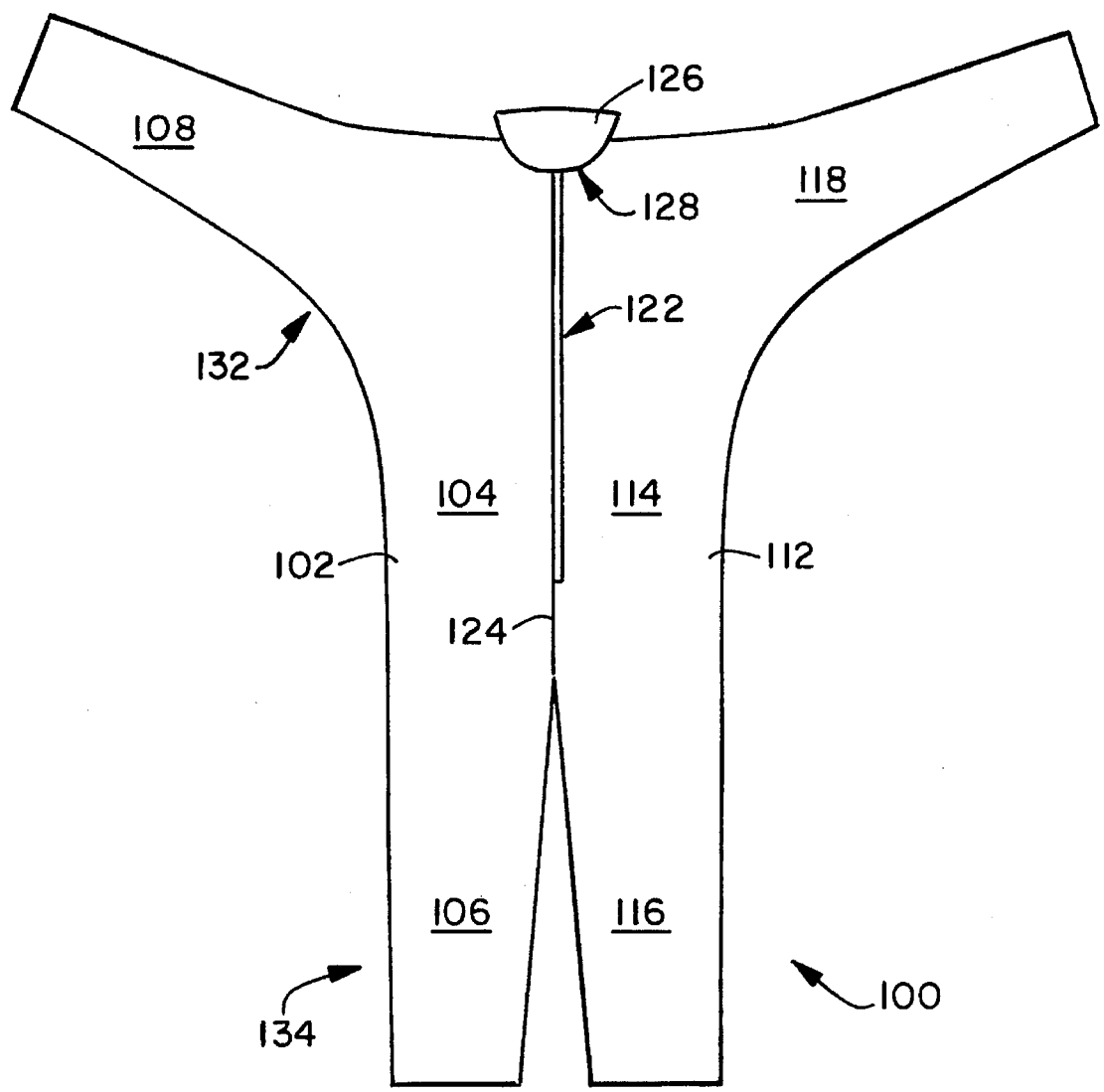
FIG. 1 illustrates exemplary disposable protective coveralls.

FIG. 1 illustrates exemplary disposable protective coveralls 100 of the present invention which are adapted to permit arm movement without significant pulling or stressing of other portions of the garment. The manufacture of such coveralls may be in accordance with known automated, semi-automated, or hand assembly procedures. It is desired that the disposable protective coveralls contain the fewest practical number of panels, portions or sections in order to reduce the number of seams in the garment for better barrier properties and to simplify the manufacturing steps. However, it is contemplated that the disposable protective coveralls of the present invention could contain sections, panels, or portions of barrier fabrics which may have different degrees of strength to customize the coverall for a particular application. For example, the sleeve portions or other portions (e.g., leg portions, shoulder portions or back portions of the coveralls) may include double layers of barrier fabrics with very high levels of strength and toughness.

The coveralls 100 contain a left panel 102 which includes a left body portion 104 and a left leg portion 106. The coveralls contain a left sleeve portion 108. Desirably, the left sleeve portion 108 is an integral part of the left panel 102 (i.e., the left panel has been cut to form a left sleeve portion. It is contemplated that the left sleeve portion 108 may be a separate piece of material that could be joined to the left panel 102 by a seam (not shown). The coveralls also contain a right panel 112 which includes a right body portion 114 and a right leg portion 116. The coveralls contain a right sleeve portion 118. Desirably, the right sleeve portion 118 is an integral part of the right panel 112 (i.e., the right panel has been cut to form a right sleeve portion. It is contemplated that the right sleeve portion 118 may be a separate piece of material that could be joined to the right panel 112 by a seam (not shown). The left panel 102 and the right panel are joined by a zipper closure 122 and a seam 124. An optional collar 126 may be attached by a seam 128. Alternatively and/or additionally, a hood (not shown) may be attached to more fully enclose the head of a person wearing the protective coveralls. Desirably, left panel 102 and right panel 112 are constructed so that the upper sections 132 and the lower sections 134 of the coveralls corresponding to the left panel 102 and right panel 112 are made from a single or integral piece of material. Although less desirable, it is contemplated that a seam (not shown) may be used to join the upper sections 132 and the lower sections 134.

Differing constructions are contemplated and various seams and panels of other possible constructions are not shown. An exemplary coverall is set forth in U.S. Pat. No. 4,670,913, assigned to the assignee of the present invention and incorporated herein by reference.

Figure 2:
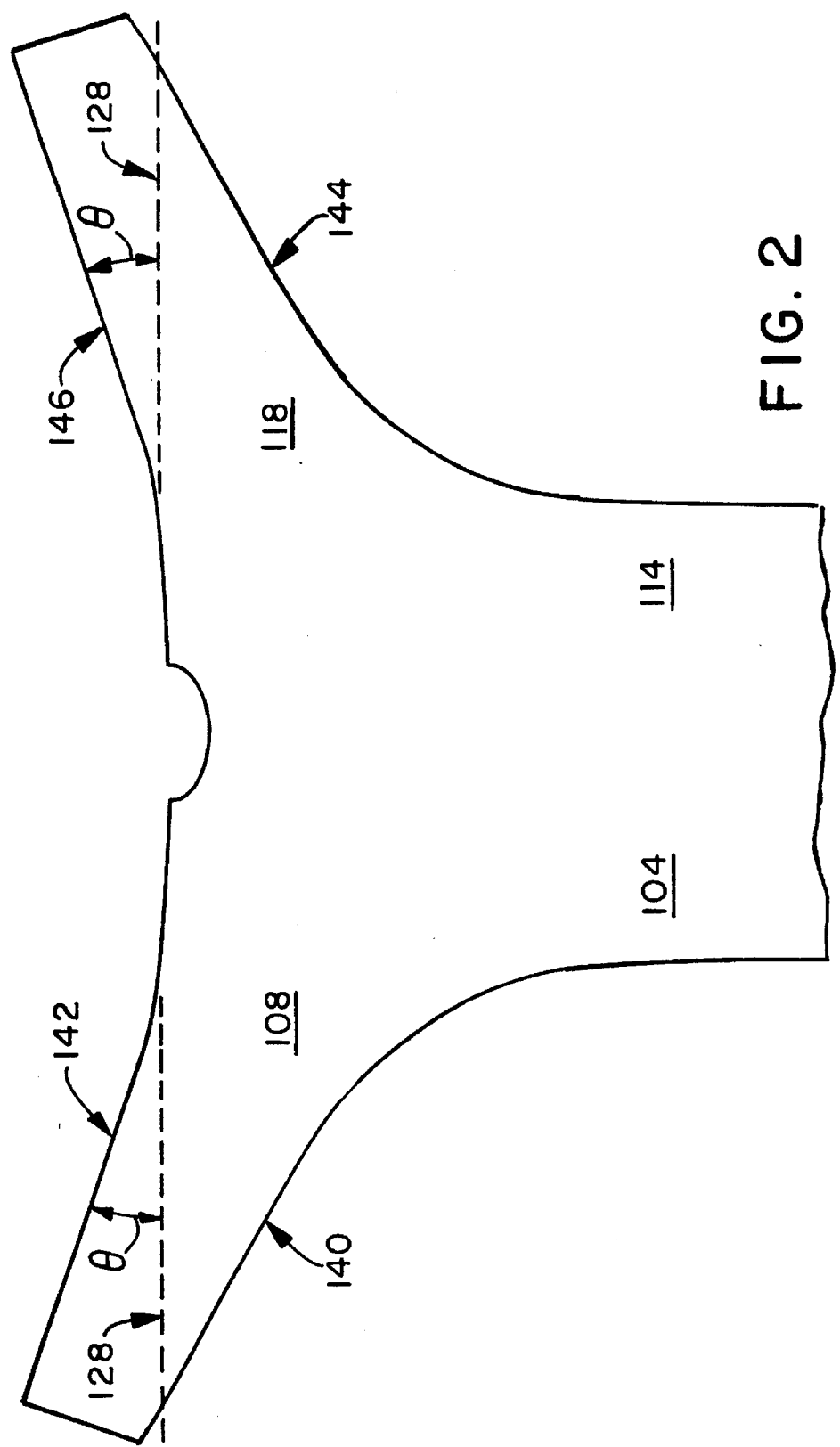
FIG. 2 illustrates a detail of an exemplary disposable protective coveralls.

Referring to FIG. 2, the two sleeve portions 108 and 118 extend from the corresponding body portions 104 and 114 in which each sleeve portion has an inner edge and an outer edge. In particular, left sleeve portion 108 has an inner edge 140 and an outer edge 142. Right sleeve portion 118 has an inner edge 144 and an outer edge 146.

The outer edge of each sleeve portion extends upward from a shoulder line 148 at an angle $\phi$ ranging from about 10° to about 90° and the inner edge of each sleeve extends upward from the body portion below the shoulder line so that arm movement is permitted without significant pulling or stressing of other portions of the coverall. Generally speaking, the outer edge of each sleeve portion may extend upward from the shoulder line at an angle $\phi$ ranging from about 15° to about 75°. As an example, the outer edge of each sleeve portion may extend upward from the shoulder line at an angle $\phi$ ranging from about 20° to about 45°.

More particularly, the outer edge 142 of the left sleeve portion 108 extends upward from the shoulder line 148 at an angle $\phi$ ranging from about 10° to about 90° and the inner edge 140 of the left sleeve portion 108 extends upward from the body portion 104 below the shoulder line so that arm movement is permitted without significant pulling or stressing of other portions of the coverall. Similarly, the outer edge 146 of the right sleeve portion 118 extends upward from the shoulder line 148 at an angle $\phi$ ranging from about 10° to about 90° and the inner edge 144 of the right sleeve portion 118 extends upward from the body portion 114 below the shoulder line so that arm movement is permitted without significant pulling or stressing of other portions of the coverall.

An exemplary high strength inelastic barrier fabric which could be used for the manufacture of the disposable protective coveralls of the present invention is laminated fabric constructed by bonding together at least one layer of a nonwoven web with at least one layer of a film.

Generally speaking, this laminate may have a basis weight ranging from about 25 grams per square meter (gsm) to about 200 gsm. For example, the high strength barrier fabric may have a basis weight ranging from about 50 gsm to about 150 gsm. Although the basis weight of the laminate will vary depending on the materials used, lower basis weight materials are desirable for comfort and conformability and higher basis weight materials are desirable for toughness and durability. The film-nonwoven web laminate construction permits combinations of materials providing high strength at relatively low basis weights and the design of the coveralls allows such strong and relatively unyielding materials to be used in a comfortable garment.

The nonwoven web component may be one or more bonded carded webs, webs of spunbonded filaments, webs of meltblown fibers, laminates containing spunbonded filament webs and meltblown fiber webs and mixtures thereof. These nonwoven webs may be formed from thermoplastic polymers or thermoset polymers. Useful polymers include, for example, polyamides, polyolefins, polyesters, polyvinyl alcohols, polyurethanes, polyvinyl chlorides, polyfluorocarbons, polystyrenes, caprolactams, poly(ethylene vinyl acetates), ethylene n-butyl acrylates, and cellulosic and acrylic resins. If the nonwoven web is formed from a polyolefin, the polyolefin may be polyethylene, polypropylene, polybutene, ethylene copolymers, propylene copolymers and butene copolymers.

The nonwoven web component of the high strength barrier fabric may have a basis weight ranging from about 15 gsm to about 150 gsm. For example, the nonwoven web component may have a basis weight ranging from about 25 gsm to about 100 gsm. Desirably, the nonwoven web component of the high strength barrier fabric may have a basis weight ranging from about 20 gsm to about 75 gsm.

Multiple layers of nonwoven webs may be joined to form the nonwoven web component of the high strength barrier fabric. It is contemplated that such multi-layer nonwoven webs may be used to form the coveralls without adding a film layer at least to the extent that the multi-layer nonwoven webs provide the desired high strength barrier properties. Useful multi-layer nonwoven webs may be made by joining at least one web of meltblown fibers (which may include meltblown microfibers) with at least one spunbonded continuous filament web. An exemplary multi-layer barrier fabric for the manufacture of the disposable protective coveralls of the present invention is a nonwoven laminated fabric constructed by bonding together layers of spunbonded continuous filaments webs and webs of meltblown fibers (which may include meltblown microfibers) and may also include a bonded carded web or other nonwoven fabric. This material is so inexpensive to produce that it may be considered to be a disposable material. An exemplary three-layer fabric having a first outer ply of a spunbonded web, a middle ply of a meltblown web, and a second outer ply of a spunbonded web may be referred to in shorthand notation as SMS. The fibers and/or filaments in such fabrics may be polyolefins, polyesters, and polyamides. If polyolefins are used for the fibers and/or filaments, desirable polyolefins include polyethylene, polypropylene, polybutene, ethylene copolymers, polypropylene copolymers and butene copolymers, as well as blends and copolymers including the foregoing. Desirably, the polyolefin may be a random block copolymer of propylene and ethylene which contains about 3 percent or more, by weight, ethylene. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

The multi-layer nonwoven web (used alone or as a component of the high strength barrier laminate) may have a total basis weight of between about 30 gsm to about 250 gsm. For example, the multi-layer nonwoven web may have a basis weight ranging from about 40 gsm to about 175 gsm. Desirably, the multi-layer nonwoven web may have a basis weight ranging from about 50 gsm to about 150 gsm. The multi-layer nonwoven web is desirably of spunbond-meltblown-spunbond (SMS) construction in which each layer has a basis weight from about 9 gsm to about 70 gsm. For example, each layer may have a basis weight of from about 12 gsm to about 34 gsm. As a further example, each layer may have a basis weight of from about 14 gsm to about 27 gsm. To improve resistance to liquid and reduce static buildup, the material may also be treated with compositions such as Zepel® and Zelec® K-C, available from E. I. du Pont De Nemours.

Desirably, the high strength barrier fabric may include least one film layer made of a polymer selected from polyamides, polyolefins, polyesters, polyvinyl alcohols, polyurethanes, polyvinyl chlorides, polyfluorocarbons, polystyrenes, caprolactams, poly(ethylene vinyl acetates), ethylene n-butyl acrylates, and cellulosic and acrylic resins. If the film is formed from a polyolefin, the polyolefin may be, for example, polyethylene, polypropylene, polybutene, ethylene copolymers, propylene copolymers and butene copolymers. Generally speaking, the film will have a thickness ranging from about 0.25 mil to about 5.0 mil. For example, the film will have a thickness ranging from about 0.5 mil to about 3.0 mil. Desirably, the film will have a thickness ranging from about 1.0 mil to about 2.5 mil.

The combination of a film and a nonwoven web can provide a tough, high strength barrier fabric. One measure of fabric toughness is peak total energy absorbed (i.e., total energy absorbed at peak load) in at least one direction. In addition to toughness, high strength fabrics should provide relatively low levels of deformation or elongation in response to a stretching force. Deformation or elongation can compromise the protection of a barrier fabric. High strength fabrics should have a total elongation of less than about 100 percent in both the machine and cross machine directions.

Peak load and elongation are determined utilizing an Instron Model 1122 Universal Test Instrument essentially in accordance with Method 5100 of Federal Test Method Standard No. 191A. The sample gauge length was set at 3 inches and the cross-head speed was set at 12 inches per minute. Generally speaking, load refers to the force or resistance encountered while elongating a sample. Peak load refers to the maximum load encountered when elongating the sample. As used herein, load is expressed in units of force (e.g., pounds$_{force}$) for samples measuring 3 inches wide by 6 inches long.

Total energy absorbed refers to the total area under a stress versus strain (i.e., load vs. elongation) curve up to a specified load. Peak total energy absorbed is the total area under such a curve up to the point of peak or maximum load (which is defined above). Total energy absorbed is expressed in units of work/(length)$^2$ such as, for example, (inch•lbs$_{force}$)/(inch)$^2$.

Desirably, the high strength barrier fabric used in the construction of the disposable protective coveralls of the present invention contains a film having a thickness of at least about 1 mil and has a peak energy of at least 6 inch•pounds in both the machine and cross-machine directions. It has been found that satisfactory high strength barrier fabrics can be made utilizing a film having a thickness of at least about 1 mil and has a peak energy of at least 15 inch•pounds force per square inch in both the machine and cross-machine directions. In fact, useful materials have been made which contain a film having a thickness of at least about 1 mil and has a peak energy of at least 30 inch•pounds force per square inch in both the machine and cross-machine directions.

Elongation or stretch refers to a ratio determined by measuring the difference between a nonwoven web's initial unextended measurement (e.g., length) and its extended measurement in a particular dimension and dividing that difference by the nonwoven web's initial unextended measurement in that same dimension. This value is multiplied by 100 percent when elongation is expressed as a percent. Total elongation generally refers to elongation at break or failure of the sample.

In certain applications, it is desirable for the disposable protective coverall to be formed from a high strength barrier fabric which is breathable. That is, the barrier fabric should be impervious to liquids but should permit water vapor to diffuse or pass through the fabric. One measure of breathability as used in the present invention is the water vapor transmission rate. The term "water vapor transmission rate" refers to the rate water vapor will pass through a liquid (i.e., water) impervious sheet material under specified conditions in a certain time period. Unless otherwise specified, water vapor transmission rate is measured in accordance with ASTM E 96-80 using the method referenced at paragraph 3.2. The test is run at 100° F. under uncontrolled relative humidity conditions. The sample and a standard material are tested simultaneously. The standard material is Celgard® 2500 available from Hoechst Celanese, Separation Products Division, Charlotte, N.C. The water vapor transmission rate for the sample is then normalized based upon the results obtained for the standard material. The breathable high strength barrier fabric may be a laminate of at least one nonwoven Web and at least one film, in which the film component of the laminate has a thickness of at least about 1 mil and a peak energy of at least 6 inch•pounds force per square inch in both the machine and cross-machine directions, and in which the breathable barrier laminate provides a water vapor transmission rate greater than about 100 gm/m$^2$/24 hours. For example, the breathable barrier laminate may provide a water vapor transmission rate greater than about 500 gm/m$^2$/24 hours. Desirably, the breathable barrier laminate may provide a water vapor transmission rate greater than about 750 gm/m$^2$/24 hours.

Exemplary high strength barrier fabrics that can be used in the manufacture of the disposable protective coveralls of the present invention are listed in Table 1. As can be seen, laminates containing nonwoven webs and films provide useful levels of toughness (i.e., peak total energy absorbed) and, in some cases, desirable water vapor transmission rates.

Three nonwoven fabrics were used as substrates for the laminates listed in Table 1. Spunbonded polypropylene continuous filament web having a basis weight of about 41 grams per square (gsm) meter was used as one substrate. This material was formed utilizing a conventional spunbonding process and is available from the Kimberly-Clark Corporation, Neenah, Wis.

Another substrate was a high pulp content spunbonded continuous filament composite referred to in Table 1 as "HET". This material had a basis weight of about 95 gsm and was composed of about 84 percent, by weight, pulp and about 16 percent, by weight, spunbonded polypropylene continuous filament web. This material was formed essentially as described in U.S. patent application Ser. No. 08/000,908 filed on Jan. 6, 1993, by C. H. Everhart, et al., entitled "High Pulp Content Nonwoven Composite Fabric", the entire content of which is incorporated herein by reference.

The third substrate was a through-air bonded carded web referred to in Table 1 as "TABBI". This material had a basis weight of about 51 gsm and was composed of about 60 percent, by weight, polyester staple fibers and about 40 percent, by weight, bi-component polyethylene/polyester staple fibers. The web was formed utilizing conventional carding equipment and bonded utilizing a conventional heated through-air treatment which caused thermal bonding of the fibers.

Laminates were formed by combining each substrate with a film layer. Four different types of film were applied utilizing three film thickness. The films were applied by extrusion coating the substrates and then passing the superposed materials through the nip of smooth calender rolls. The films were formed so they would create a layer on the substrate having a thicknesses (excluding the substrate) of about 1.25 mil, 2.0 mil and 3.0 mil.

The film laminate component identified in Table 1 as "PE" was a conventional low density polyethylene film such as, for example, a film formed from PE NA 206-000 containing about 10 percent, by weight, $TiO_2$, available from Quantum Chemical Corporation of Cincinnati, Ohio.

The film laminate component identified in Table 1 as "EnBA" was a filmed formed from a copolymer of ethylene and n-butyl acrylate such as, for example, EA 720-009 available from Quantum Chemical Corporation of Cincinnati, Ohio.

The film laminate component identified in Table 1 as "PP" was a film formed from conventional film grade polypropylene such as, for example, PP-3245 and PP-3214 available from the Exxon Chemical Company; PC-973 and PF-301 available from Himont Incorporated; and DX5A09 available from the Shell Chemical Company.

The film laminate component identified in Table 1 as "Hytrel" was a film formed from copolyetherester elastomer available under the trade designation HYTREL® from E. I. DuPont De Nemours & Company.

Referring to Table 2, three different spunbonded continuous filament nonwoven webs were used as substrates for lamination. These materials were formed utilizing a conventional spunbonding process and are available from the Kimberly-Clark Corporation, Neenah, Wis. Two of the spunbonded polypropylene continuous filament webs had basis weights of about 41 grams per square (gsm) meter, and 51 gsm, respectively. The heaviest spunbonded web had a basis weight of about 85 gsm and contained a coating of meltblown fibers which added about 13 gsm to the basis weight of the web for a total basis weight of about 98 gsm.

Laminates were formed by combining each spunbonded substrate with a polyethylene film layer which was the same as described for Table 1. The polyethylene films were applied by extrusion coating the substrates and then passing the material through the nip of a smooth calender roll. The films were formed to they would create a layer on the substrate having a thicknesses (excluding the substrate) of either about 1.25 mil or about 1.5 mil.

Table 2 also discloses useful high strength barrier fabrics available from the Kimberly-Clark Corporation under the trade designation KLEENGUARD®. These fabrics may be used in the manufacture of the disposable protective coveralls of the present invention. These fabrics are nonwoven laminated fabrics constructed by bonding together layers of spunbonded continuous filaments webs and webs of meltblown fibers (including meltblown microfibers). The fabrics may also include a bonded carded web or other nonwoven material. The KLEENGUARD® fabrics of Table 2 have a basis weight of about 58 gsm and are composed of a first outer ply of a spunbonded polypropylene continuous filament web, a middle ply of a meltblown polypropylene web, and a second outer ply of a spunbonded polypropylene continuous filament web. These plys are joined together by conventional thermal bonding techniques utilizing heat and pressure. Such fabrics are described in U.S. Pat. Nos. 4,041,203, 4,374,888, and 4,753,843, the contents of which are incorporated herein by reference.

TABLE 1

| | Basis Weight | Grab Tensile $LBS_f$ | | Elongation % | | Peak Energy IN · $LBS_f/IN^2$ | | WVTR |
|---|---|---|---|---|---|---|---|---|
| | OSY* | MD | CD | MD | CD | MD | CD | GM/M2/24 HRS |
| SUBSTRATE | | | | | | | | |
| Spunbonded polypropylene | 1.2 | 14.7 | 12.1 | 44.1 | 53.5 | 11.0 | 11.0 | |
| HET | 2.8 | 13.6 | 9.0 | 16.6 | 64.2 | 5.1 | 10.6 | |
| TABBI | 1.5 | 5.2 | 1.8 | 40.6 | 70.9 | 4.1 | 3.7 | |
| 1.25 mil FILM LAMINATES | | | | | | | | |
| PE ON HET | 3.7 | 17.6 | 10.1 | 18.5 | 38.9 | 6.8 | 7.9 | 82 |
| PE ON TABBI | 2.4 | 16.4 | 8.7 | 39.2 | 59.9 | 12.4 | 10.2 | 427 |
| PE ON SB | 1.9 | 19.7 | 12.9 | 37.1 | 39.3 | 14.1 | 9.6 | 88 |
| EnBA ON HET | 3.3 | 16.3 | 11.5 | 20.0 | 69.3 | 7.2 | 14.9 | 336 |
| EnBA ON SB | 1.9 | 20.6 | 13.1 | 32.6 | 60.9 | 12.6 | 14.6 | 170 |
| EnBA ON TABBI | 2.2 | 11.3 | 7.2 | 45.7 | 104.5 | 10.3 | 14.9 | 364 |
| PP ON HET | 3.8 | 20.1 | 14.6 | 19.1 | 68.5 | 8.8 | 20.0 | 69 |
| PP ON SB | 2.0 | 28.6 | 22.3 | 42.2 | 63.1 | 23.2 | 25.9 | 196 |
| PP ON TABBI | 2.5 | 17.6 | 10.1 | 37.3 | 80.0 | 13.2 | 17.4 | 811 |
| 2.0 mil BREATHABLE FILM LAMINATES | | | | | | | | |

TABLE 1-continued

|  | Basis Weight | Grab Tensile LBS$_f$ | | Elongation % | | Peak Energy IN · LBS$_f$/IN$^2$ | | WVTR |
| --- | --- | --- | --- | --- | --- | --- | --- | --- |
|  | OSY* | MD | CD | MD | CD | MD | CD | GM/M2/24 HRS |
| HYTREL ON HET | 4.3 | 18.2 | 18.8 | 17.4 | 95.3 | 7.8 | 37.3 | 1480 |
| HYTREL ON SB | 2.8 | 22.0 | 21.4 | 46.3 | 58.8 | 18.1 | 22.3 | 1514 |
| HYTREL ON TABBI | 3.2 | 11.3 | 12.6 |  |  | 85.8 | 117.6 | 1475 |
| 3.0 mil BREATHABLE FILM LAMINATES | | | | | | | | |
| HYTREL ON HET | 2.8 | 21.7 | 22.7 | 15.4 | 86.8 | 7.1 | 40.7 | 1294 |
| HYTREL ON SB | 4.1 | 30.3 | 27.9 | 50.6 | 76.8 | 29.6 | 44.1 | 908 |
| HYTREL ON TABBI | 4.5 | 21.5 | 21.3 | 69.5 | 182 | 33.6 | 89.2 | 996 |

*Ounces per square yard

TABLE 2

|  | Basis Weight | Grab Tensile LBS$_f$ | | Elongation % | | Peak Energy IN · LBS$_f$/IN$^2$ | | WVTR |
| --- | --- | --- | --- | --- | --- | --- | --- | --- |
|  | OSY* | MD | CD | MD | CD | MD | CD | GM/M2/24 HRS |
| SUBSTRATE | | | | | | | | |
| 1.25 osy SB | 1.2 | 25.0 | 16.3 | 46.0 | 54.5 | 20.6 | 15.4 |  |
| 1.5 osy SB | 1.5 | 31.6 | 21.8 | 50.6 | 61.9 | 29.0 | 25.6 |  |
| 2.5 osy SB (with MB dust) | 2.9 | 49.6 | 40.9 | 55.6 | 61.9 | 50.7 | 46.2 |  |
| KLEENGUARD ® | | | | | | | | |
| LP | 1.7 | 11.7 | 9.8 | 45.9 | 34.4 | 1.4 | 1.0 | 4862 |
| DP | 1.7 | 14.4 | 17.6 | 41.4 | 49.8 | 1.2 | 1.5 | 4565 |
| PE LAMINATES | | | | | | | | |
| 1.25 osy SB/1.25 mil PE film | 3.4 | 33.7 | 23.0 | 48.7 | 53.2 | 32.3 | 22.9 | 91 |
| 1.25 osy SB/1.5 mil PE film | 3.5 | 34.1 | 23.5 | 48.3 | 55.4 | 32.5 | 24.7 | 104 |
| 1.5 osy SB/1.25 mil PE film | 3.7 | 38.9 | 27.1 | 53.1 | 59.1 | 40.4 | 30.2 | 115 |
| 1.5 osy SB/1.5 mil PE film | 3.8 | 36.1 | 25.1 | 45.3 | 54.6 | 31.7 | 26.9 | 127 |
| 2.5 osy SB/1.25 mil PE film** | 4.5 | 58.5 | 44.6 | 61.7 | 65.2 | 69.1 | 54.6 | 131 |
| 2.5 osy SB/1.5 mil PE film** | 4.8 | 60.7 | 45.6 | 51.1 | 63.0 | 59.0 | 54.8 | 174 |

*Ounces per square yard
**The 2.5 osy SB had a dusting of MB

The foregoing description relates to preferred embodiments of the present invention, modifications or alterations may be made without departing from the spirit and scope of the invention as defined in the following claims.

What is claimed is:

1. A disposable protective coverall formed from a high strength barrier fabric, the coverall comprising:

a body portion having a neck opening in a shoulder line at its top;

two sleeve portions extending from the body portion, each sleeve portion having an inner edge and an outer edge; and two leg portions extending from the body portion, wherein the fully extended sleeve portions extend from the body portion when the coverall is lain flat, prior to donning, such that the outer edge of each sleeve portion extends upward from the shoulder line at an angle ranging from about 10° to about 90° and the inner edge of each sleeve extends upward from the body portion below the shoulder line so that arm movement is permitted without significant pulling or stressing of other portions of the coverall.

2. The disposable protective coverall of claim 1 wherein the high strength barrier fabric comprises a laminate containing at least one nonwoven web and at least one film layer.

3. The disposable protective coverall of claim 2 wherein the high strength barrier fabric includes at least one nonwoven web selected from the group consisting of bonded carded webs, webs of spunbonded filaments, webs of meltblown fibers, laminates containing spunbonded filament webs and meltblown fiber webs and mixtures thereof.

4. The disposable protective coverall of claim 3 wherein the nonwoven web component of the high strength barrier fabric is formed from a polymer selected from polyamides, polyolefins, polyesters, polyvinyl alcohols, polyurethanes, polyvinyl chlorides, polyfluorocarbons, polystyrenes, caprolactams, copolymers of ethylene and at least one vinyl monomer, copolymers of ethylene and n-butyl acrylate, and cellulosic and acrylic resins.

5. The disposable protective coverall of claim 4 wherein the nonwoven web component of the high strength barrier fabric is formed from a polyolefin selected from polyethylene, polypropylene, polybutene, ethylene copolymers, propylene copolymers and butene copolymers.

6. The disposable protective coverall of claim 2 wherein the nonwoven web component of the high strength barrier fabric has a basis weight ranging from about 15 gsm to about 200 gsm.

7. The disposable protective coverall of claim 6 wherein the nonwoven web component of the high strength barrier fabric has a basis weight ranging from about 20 gsm to about 75 gsm.

8. The disposable protective coverall of claim 2 wherein the high strength barrier fabric includes at least one film layer made of a polymer selected from polyamides, polyolefins, polyesters, polyvinyl alcohols, polyurethanes, polyvinyl chlorides, polyfluorocarbons, polystyrenes, caprolactams, copolymers of ethylene and at least one vinyl monomer, copolymers of ethylene and n-butyl acrylate, and cellulosic and acrylic resins.

9. The disposable protective coverall of claim 8 wherein the film component of the high strength barrier fabric is formed from a polyolefin selected from polyethylene, polypropylene, polybutene, ethylene copolymers, propylene copolymers and butene copolymers.

10. The disposable protective coverall of claim 8 wherein the high strength barrier fabric includes a film layer having a thickness ranging from about 0.25 mil to about 5.0 mil.

11. The disposable protective coverall of claim 8 wherein the high strength barrier fabric has a basis weight ranging from about 25 gsm to about 300 gsm.

12. The disposable protective coverall of claim 8 wherein the high strength barrier fabric contains a film layer having a thickness of at least about 1 mil and has a peak energy of at least 6 inch•pounds force per square inch in both the machine and cross-machine directions.

13. The disposable protective coverall of claim 8 wherein the high strength barrier fabric contains a film layer having a thickness of at least about 1 mil and has a peak energy of at least 15 inch•pounds force per square inch in both the machine and cross-machine directions.

14. The disposable protective coverall of claim 8 wherein the high strength barrier fabric contains a film layer having a thickness of at least about 1 mil and has a peak energy of at least 30 inch•pounds force per square inch in both the machine and cross-machine directions.

15. The disposable protective coverall of claim 2 wherein the high strength barrier laminate provides a water vapor transmission rate greater than about 750 gm/m²/24 hours.

16. A disposable protective coverall formed from a breathable barrier laminate of at least one nonwoven web and at least one film layer, the coverall comprising:

a body portion having a neck opening in a shoulder line at its top;

two sleeve portions extending from the body portion, each sleeve portion having an inner edge and an outer edge; and two leg portions extending from the body portion, wherein the fully extended sleeve portions extend from the body portion when the coverall is lain flat, prior to donning, such that the outer edge of each sleeve portion extends upward from the shoulder line at an angle ranging from about 10° to about 90° and the inner edge of each sleeve extends upward from the body portion below the shoulder line so that arm movement is permitted without significant pulling or stressing of other portions of the coverall, and wherein the film component of the breathable barrier laminate has a thickness of at least about 1 mil and a peak energy of at least 6 inch•pounds force per square inch in both the machine and cross-machine directions.

17. The disposable protective coverall of claim 16 wherein the breathable barrier laminate includes at least one film layer having a thickness ranging from about 1 mil to about 5.0 mil.

18. The disposable protective coverall of claim 17 wherein the breathable barrier laminate contains a film layer having a thickness of at least about 1 mil and has a peak energy of at least 15 inch•pounds force per square inch in both the machine and cross-machine directions.

19. The disposable protective coverall of claim 17 wherein the breathable barrier laminate contains a film layer having a thickness of at least about 1 mil and has a peak energy of at least 30 inch•pounds force per square inch in both the machine and cross-machine directions.

20. A disposable protective coverall formed from a high strength barrier laminate of at least one nonwoven web and at least one film layer, the coverall comprising:

a body portion having a neck opening in a shoulder line at its top;

two sleeve portions extending from the body portion, each sleeve portion having an inner edge and an outer edge; and two leg portions extending from the body portion, the fully extended sleeve portions extending from the body portion when the coverall is lain flat, prior to donning, such that the outer edge of each sleeve portion extends upward from the shoulder line at an angle ranging from about 10° to about 90° and the inner edge of each sleeve extending upward from the body portion below the shoulder line so that arm movement is permitted without significant pulling or stressing of other portions of the coverall, the film component of the high strength barrier laminate having a thickness of at least about 1.25 mil and a peak energy of at least 6 inch•pounds force per square inch in both the machine and cross-machine directions, and the breathable barrier laminate providing a water vapor transmission rate greater than about 100 gm/m²/24 hours.

* * * * *